(12) United States Patent
Kray et al.

(10) Patent No.: US 11,674,395 B2
(45) Date of Patent: Jun. 13, 2023

(54) TURBOMACHINE ROTOR DISK WITH INTERNAL BORE CAVITY

(71) Applicant: GENERAL ELECTRIC COMPANY, Schenectady, NY (US)

(72) Inventors: Nicholas Joseph Kray, West Chester, OH (US); Nitesh Jain, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/024,212

(22) Filed: Sep. 17, 2020

(65) Prior Publication Data

US 2022/0082022 A1 Mar. 17, 2022

(51) Int. Cl.
*F01D 5/08* (2006.01)
*B33Y 80/00* (2015.01)
*B23P 6/00* (2006.01)

(52) U.S. Cl.
CPC ............... *F01D 5/08* (2013.01); *B23P 6/007* (2013.01); *B33Y 80/00* (2014.12)

(58) Field of Classification Search
CPC ..... F01D 5/02; F01D 5/04; F01D 5/08; F01D 5/081; F01D 5/088; F01D 5/34; B23P 15/006; B23P 6/007; B33Y 80/00
USPC ....................................................... 416/234
See application file for complete search history.

(56) References Cited

U.S. PATENT DOCUMENTS

| | | |
|---|---|---|
| 5,388,962 A | 2/1995 | Wygle et al. |
| 5,957,660 A | 9/1999 | Evans et al. |
| 5,961,287 A | 10/1999 | Cairo |
| 7,559,745 B2 * | 7/2009 | Falk ................. F04D 29/284 416/188 |
| 8,087,879 B2 | 1/2012 | Dejaune et al. |
| 9,017,013 B2 | 4/2015 | Laurello et al. |
| 9,062,557 B2 | 6/2015 | Tham et al. |
| 10,082,034 B2 | 9/2018 | Merry et al. |
| 10,107,102 B2 | 10/2018 | Virkler et al. |
| 10,385,695 B2 * | 8/2019 | Abrari ................. B23P 15/04 |
| 2016/0319667 A1 * | 11/2016 | Zelesky ................. F02C 3/04 |
| 2018/0347367 A1 | 12/2018 | Virkler et al. |

* cited by examiner

*Primary Examiner* — Eldon T Brockman
*Assistant Examiner* — Maxime M Adjagbe
(74) *Attorney, Agent, or Firm* — Dinsmore & Shohl LLP (57) ABSTRACT

A rotor disk for a gas turbine engine includes a disk body having a central bore extending therethrough. The disk body includes a bore body that extends around the central bore, a web that extends radially outward from the bore body having decreased thickness relative to the bore body and a peripheral rim that is located at an outer end of the web. The peripheral rim includes blade mounting structures for engaging complementary mounting structures of rotor blades. The bore body has a bore cavity that extends continuously through the bore body and about an entire periphery of the central bore. The bore cavity has a central axis that forms a circle about the central bore.

17 Claims, 7 Drawing Sheets

TURBOMACHINE ROTOR DISK WITH INTERNAL BORE CAVITY

BACKGROUND

Field

The present specification generally relates to gas turbine engines and, more specifically, to rotor disks that include an internal bore cavity.

Technical Background

Many gas turbine engines include a rotor assembly that includes a rotor disk and an array of rotor blades that extend radially outward from a perimeter of the rotor disk. The rotor blades may be formed separately from the rotor disk and then attached thereto, or the rotor blades may be formed as a monolithic part of the rotor disk.

The rotor disks are often located within a heated environment and rotate at high speeds. The rotor disks may be formed with an inner bore body that is thicker than an adjacent web section in order to better withstand the hoop stresses placed on the rotor disks as they rotate during operation. Temperature gradients along a radial direction of the rotor disks can also place additional thermal stresses on the rotor disks, particularly at the inner bore body.

SUMMARY

In one embodiment, a rotor disk for a gas turbine engine includes a disk body having a central bore extending therethrough. The disk body includes a bore body that extends around the central bore, a web that extends radially outward from the bore body having decreased thickness relative to the bore body and a peripheral rim that is located at an outer end of the web. The peripheral rim includes blade mounting structures for engaging complementary mounting structures of rotor blades. The bore body has a bore cavity that extends continuously through the bore body and about an entire periphery of the central bore. The bore cavity has a central axis that forms a circle about the central bore.

In another embodiment, a rotor disk for a gas turbine engine includes a disk body having a central bore extending therethrough. The disk body includes a bore body that extends around the central bore, a web that extends radially outward from the bore body having decreased thickness relative to the bore body and a peripheral rim that is located at an outer end of the web. The peripheral rim includes blade mounting structures for engaging complementary mounting structures of rotor blades. The bore body has a bore cavity that extends continuously through the bore body and about an entire periphery of the central bore. The bore cavity is at least about 25 percent of a cross-sectional area of the bore body. The cross-sectional area is taken in a cross-sectional plane perpendicular to a central axis of the bore cavity and extends radially.

In another embodiment, a method of forming a rotor disk for a gas turbine engine is provided. The method includes selecting a three-dimensional computer model of the rotor disk. The rotor disk is printed using the three-dimensional model. The rotor disk, once printed, includes a disk body having a central bore extending therethrough. The disk body includes a bore body that extends around the central bore, a web that extends radially outward from the bore body having decreased thickness relative to the bore body and a peripheral rim that is located at an outer end of the web. The peripheral rim includes blade mounting structures for engaging complementary mounting structures of rotor blades. The bore body having a bore cavity that extends continuously through the bore body and about an entire periphery of the central bore. The bore cavity is at least about 25 percent of a cross-sectional area of the bore body. The cross-sectional area is taken in a cross-sectional plane perpendicular to the central axis of the bore cavity and extends radially.

Additional features and advantages of the generator systems described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein are generally directed to rotor disk assemblies that are used in turbofan gas turbine engines. The rotor disk assemblies include a rotor disk and an array of rotor blades that extend radially outward from a perimeter of the rotor disk. The rotor disk includes a disk body that includes a bore, a bore body that extends around the bore, a web that extends radially outward from the bore body and a peripheral rim that is located at an outer end of the web. The rim may have blade mounting structures (e.g., dovetail slots) for axially receiving and retaining therein complementary dovetails of rotor blades.

The bore body is of increased thickness compared to the web. In operation, the bore body extends about a rotating shaft of the gas turbine engine. The increased thickness of the bore body can increase the hoop strength of the rotor disk and help control deflection of the rotor material during operation. As will be described in greater detail below, the bore body has a circumferentially extending bore cavity that extends through the bore body and around the bore. The bore cavity may extend continuously through the bore body and about the entire circumference of the bore. The bore cavity may be enclosed by material of the bore body except for bleed passages that intersect both the bore cavity and an outer surface of the bore body. The bleed passages may be of reduced width compared to the bore cavity. The bleed passages can allow for the ingress and egress of air during operation in order to further reduce a thermal gradient that can form in the absence of the bleed passages.

In some embodiments, the rotor disks described herein may be additively manufactured, such as through a three-dimensional printing process. These additive manufacturing processes can allow the rotor disks to be formed integrally as a single, monolithic component with relatively complex shapes and features, such as the bore cavity. Additional details of additive manufacturing processes are described in greater detail below.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
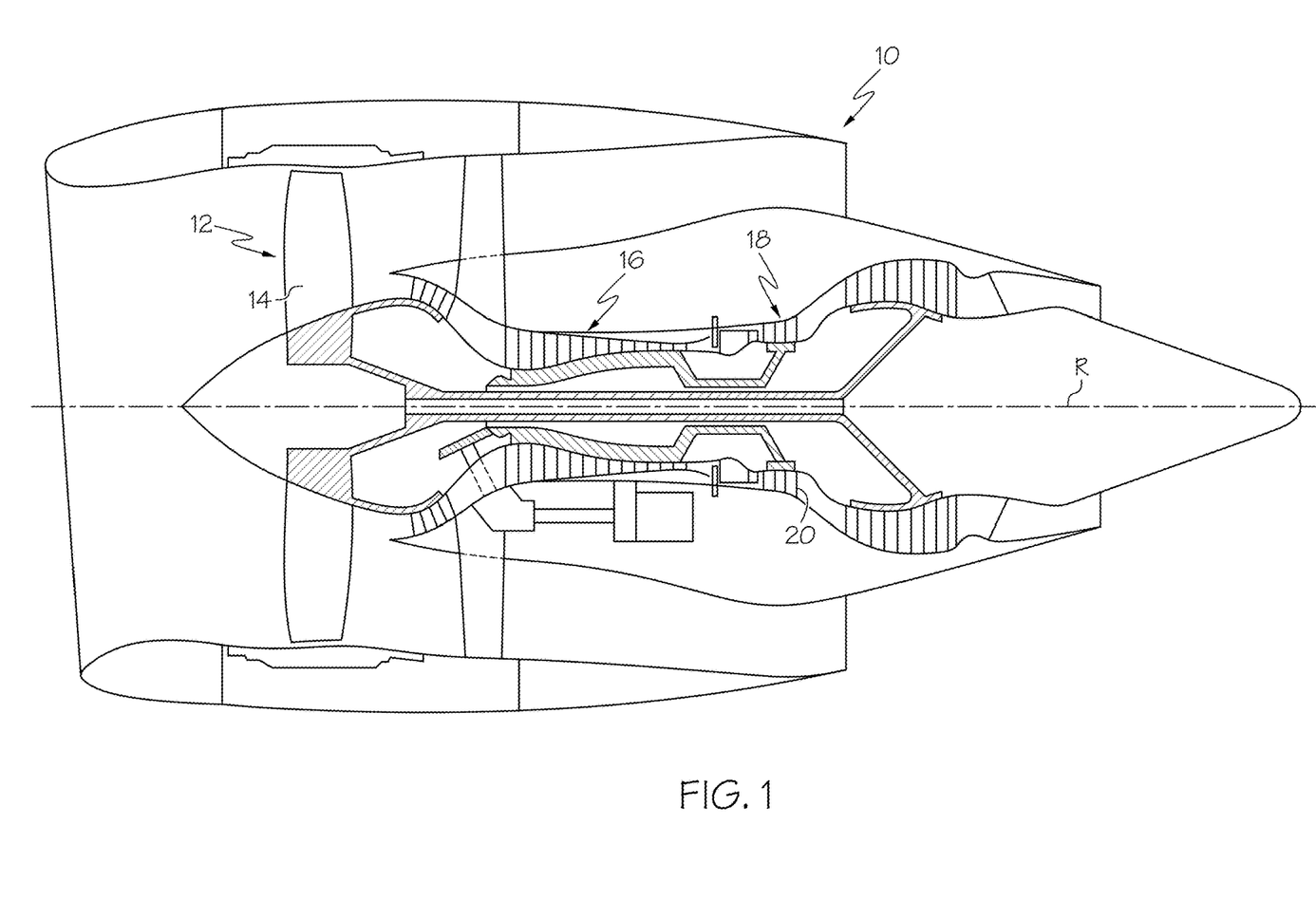
FIG. 1 is a diagrammatic, partly sectional view of a turbofan gas turbine engine, according to one or more embodiments shown and described herein.

Referring to FIG. 1, an exemplary turbofan gas turbine engine 10 is illustrated that may be part of an aircraft to provide thrust. In some embodiments, the gas turbine engine 10 may be used to provide power. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted thereby generating relatively hot combustion gas. The combustion gas causes the turbine section 18 to rotate, which also rotates the compressor section 16. The combustion gas is then exhausted through a nozzle to provide forward thrust. As can be appreciated, the rotor disks 20 are subjected to thermal and mechanical stresses during operation of the gas turbine engine 10.

Figure 2:
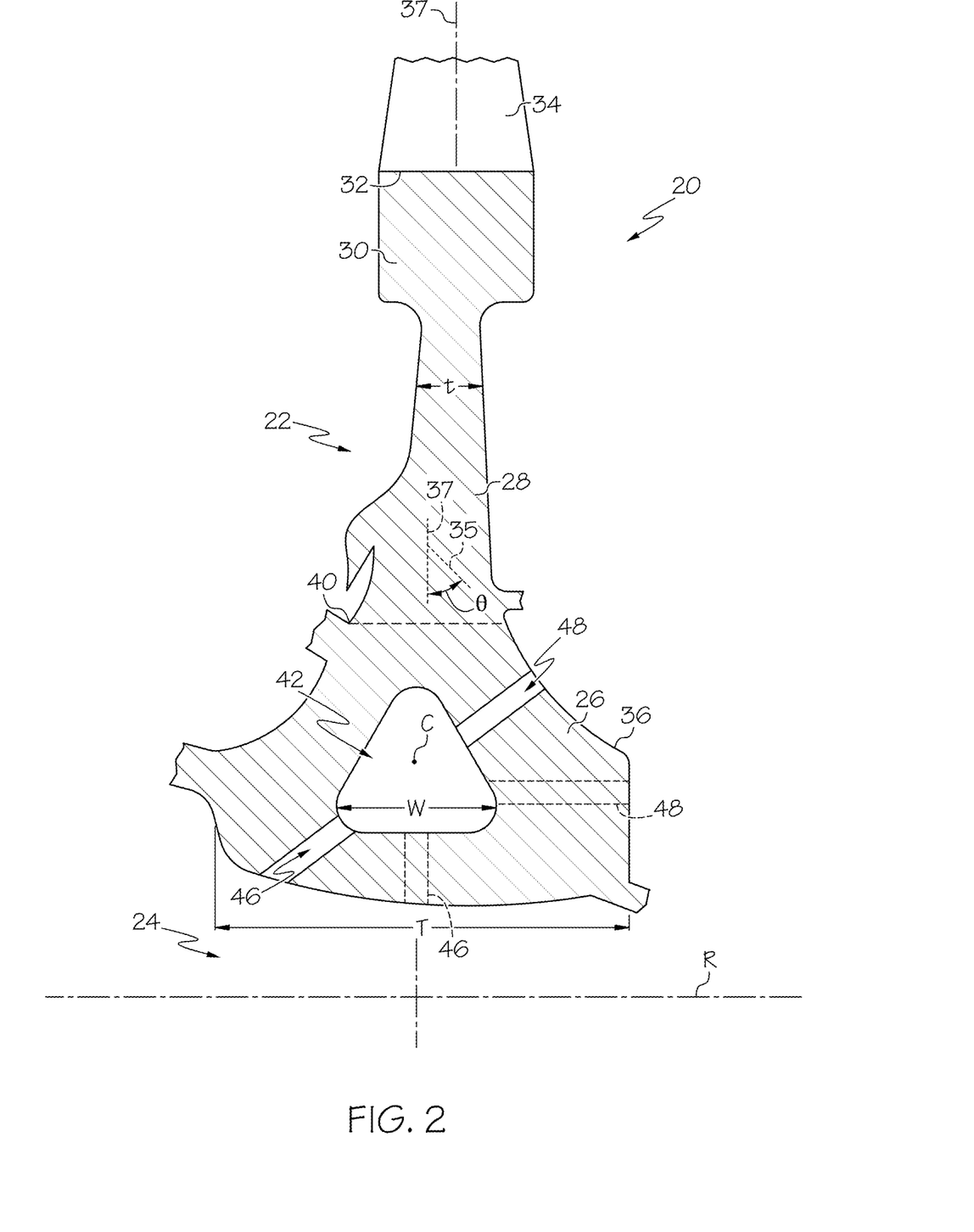
FIG. 2 is a simplified section view of a rotor disk for use with the gas turbine engine of FIG. 1 that includes a bore cavity, according to one or more embodiments shown and described herein.

Referring to FIG. 2, a section view of the rotor disk 20 is illustrated and includes a disk body 22 that includes a bore 24, a bore body 26 that extends around the bore 24, a web 28 that extends radially outward from the bore body 26 and a peripheral rim 30 that is located at an outer end of the web 28. The rim 30 may have blade mounting structures (represented by line 32, e.g., dovetail slots) for axially receiving and retaining therein complementary dovetails of rotor blades 34.

Figure 3:
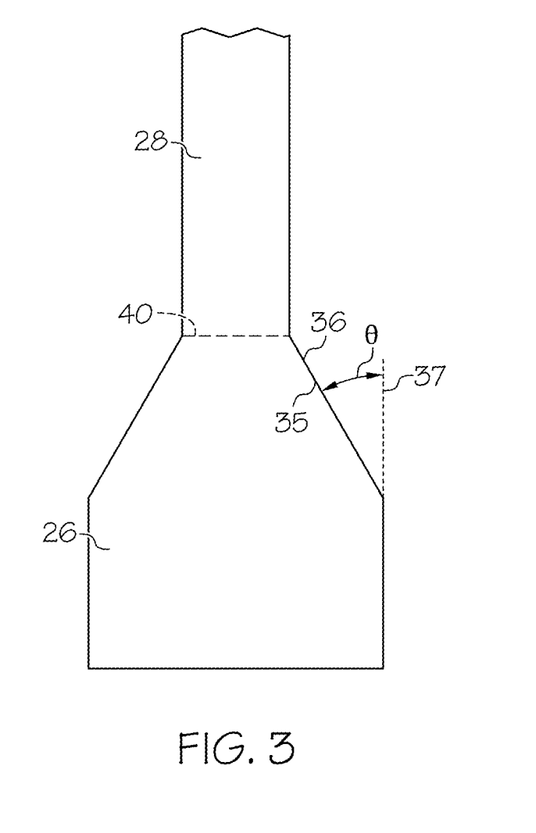
FIG. 3 is a simplified section view of the rotor disk of FIG. 2, according to one or more embodiments shown and described herein.

The bore body 26 is of increased thickness T compared to the web thickness t. In some embodiments, the transition between the bore body 26 and the web 28 may be relatively sharp. In other embodiments, such as the illustrated example, there may not be a relatively sharp outward curve that defines an outer terminus 40 of the bore body 26. Referring also to FIG. 3, the outer terminus 40 may be identified as that outermost location between the bore body 26 and the web 28 where a slope of a line 35 tangent to an outer surface 36 of the bore body 26 to a radial axis 37 of the web 28 is at an angle θ of at least about 20 degrees. In some embodiments, the outer terminus 40 may be identified as the outermost location from axis R of rotation where a thickness T of the bore body 26 is at least about 15 percent greater than the average thickness t of the web 28. In some embodiments, the outer terminus of the bore body 26 may be the radially outward-most location comparing the above slope of the line tangent to the outer surface 36 and the outermost location where the thickness T is at least about 15 percent greater than the average thickness t of the web. The location of the bore body can also be estimated using stress modeling and, in particular, by quantifying the region of the rotor disk 20 where the circumferential stress is the highest whereas the location of the web can be approximated by the region where the radial stress is more dominate during operation.

The bore body 26 has a circumferentially extending bore cavity 42 that extends through the bore body 26 and circumferentially around the bore 24. The bore cavity 42 may be annular in that the bore cavity extends continuously through the bore body 26 and about the entire circumference of the bore 24. A cross-sectional shape of the bore cavity 42 may be irregular, circular, triangular, oval, etc. In some embodiments, the shape of the bore cavity 42 may be symmetric about a radially extending plane containing a central axis C of the bore cavity 42.

The cross-sectional area of the bore cavity 42 may be selected to reduce a thermal gradient in the bore body 26 along the radial direction during engine 10 operation compared to a bore body without the bore cavity. The cross-sectional area of the bore body 26 and the bore cavity 42 is measured in a cross-sectional plane that is perpendicular to the central axis C of the bore cavity 42 and extends in a radial direction, as illustrated. In some embodiments, the cross-sectional area of the bore cavity 42 may be at least about 25 percent of a cross-sectional area of the bore body 26, such as at least about 30 percent, such as at least about 35 percent, such as at least about 40 percent, such as at least about 45 percent, such as at least about 50 percent. The presence of the bore cavity 42 can improve disk fatigue and also reduce weight of the rotor disk 20 by omitting material of the bore body 26.

In some embodiments, a maximum width W of the bore cavity 42 that is measured between outermost points of the bore cavity 42 parallel to axis R may be a preselected percentage of the maximum thickness T of the bore body 26 measured between outermost points of the bore body 26 parallel to axis R. In some embodiments, the maximum width W of the bore cavity 42 may be at least about 25 percent of the maximum thickness T of the bore body 26, such as at least about 30 percent, such as at least about 35 percent, such as at least about 40 percent, such as at least about 45 percent, such as at least about 50 percent, such as at least about 60 percent, such as at least about 70 percent, such as at least about 80 percent.

Figure 4:
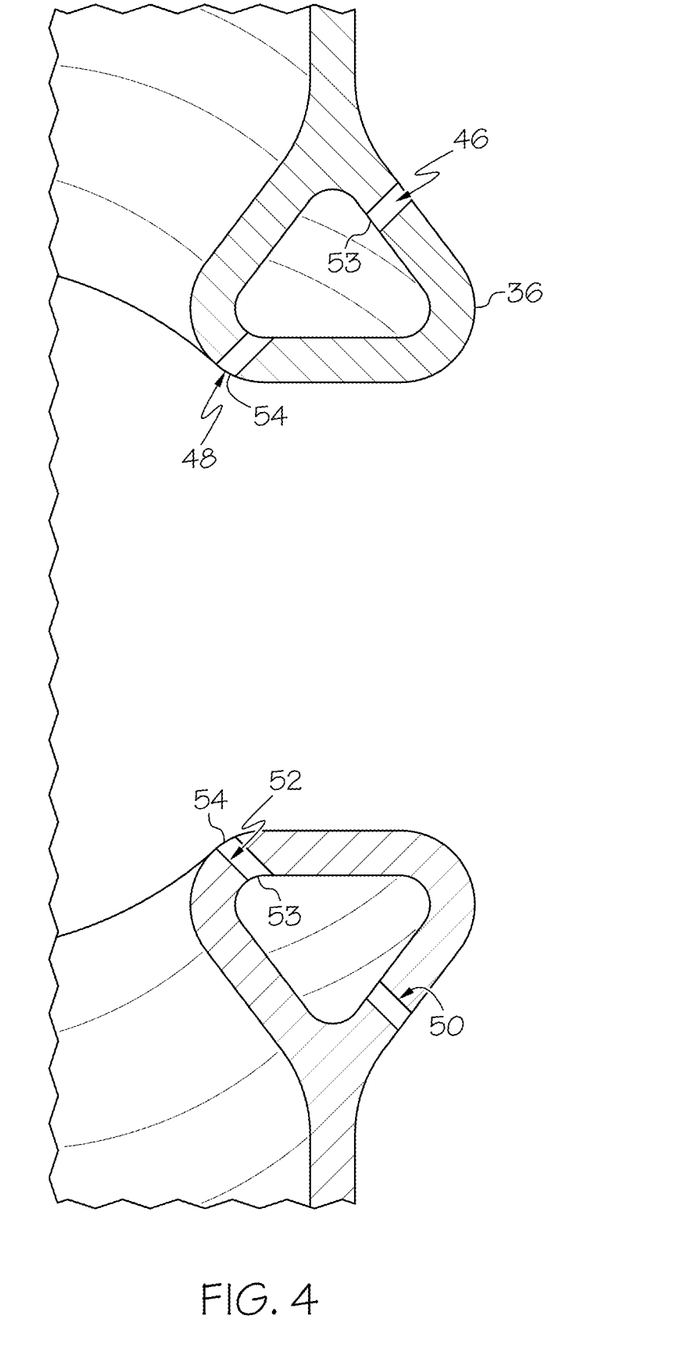
FIG. 4 is another simplified section view of the rotor disk of FIG. 3, according to one or more embodiments shown and described herein.

One or more bleed passages 46 and 48 may be provided, which can allow for the ingress and egress of air from outside the bore body 26 into and out of the bore cavity 42. While only two bleed passages 46 and 48 are shown in the cross-section of FIG. 2, referring also to FIG. 4, there may be more bleed passages 50, 52 that are circumferentially spaced apart from the bleed passages 46 and 48. The bleed passages 46, 48, 50 may be narrower in width than the bore cavity 42 (e.g., such as less than about 50 percent narrower, such as less than about 25 percent narrower). Each bleed passage 46, 48, 50, 52 includes an inner end 53 that intersects the bore cavity 42 and an outer end 54 that intersects the outer surface 36. The bleed passages 46, 48, 50. 52 may also extend at angles of less than 90 degrees to the radial axis 37, such as between about 30 degrees and 70 degrees. In some embodiments, the bleed passages may between about 90 degrees and about zero degrees, as represented by the dashed lines. Further, the bleed passages 46, 48 and 50, 52 may be aligned along a same line so that their inner ends 53 are directly across from one another. In other embodiments, the bleed passages may be offset from one another such that they do not extend along a same line.

Figure 5:
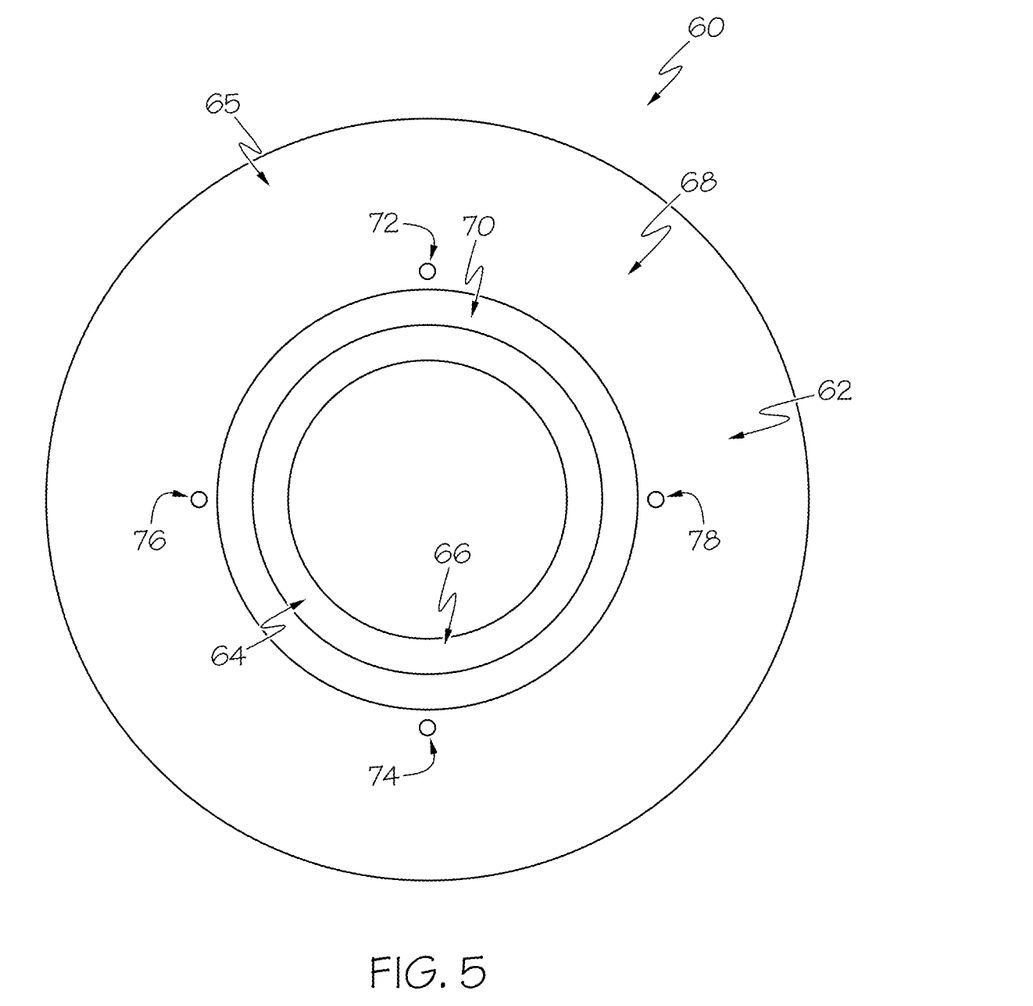
FIG. 5 is a diagrammatic view of a printed layer of the rotor disk of FIG. 2, according to one or more embodiments shown and described herein.

Referring to FIG. 5, a layer 60 of the rotor disk 20 is illustrated that includes a disk body portion 62 that includes a bore portion 64, a bore body portion 66 and a web portion 68 that extends radially outward from the bore body portion 66. A peripheral rim portion 65 is located at an outer end of the web portion 68. As indicated above, the layer 60 can be formed by 3D printing where a bore cavity portion 70 is left unprinted in layers in order to form the bore cavity 42. Bleed passage portions 72, 74, 76 and 78 are also left unprinted to form the bleed passages 46 and 48. Any number of bleed passage portions may be provided for a particular rotor disk configuration.

Figure 6A:
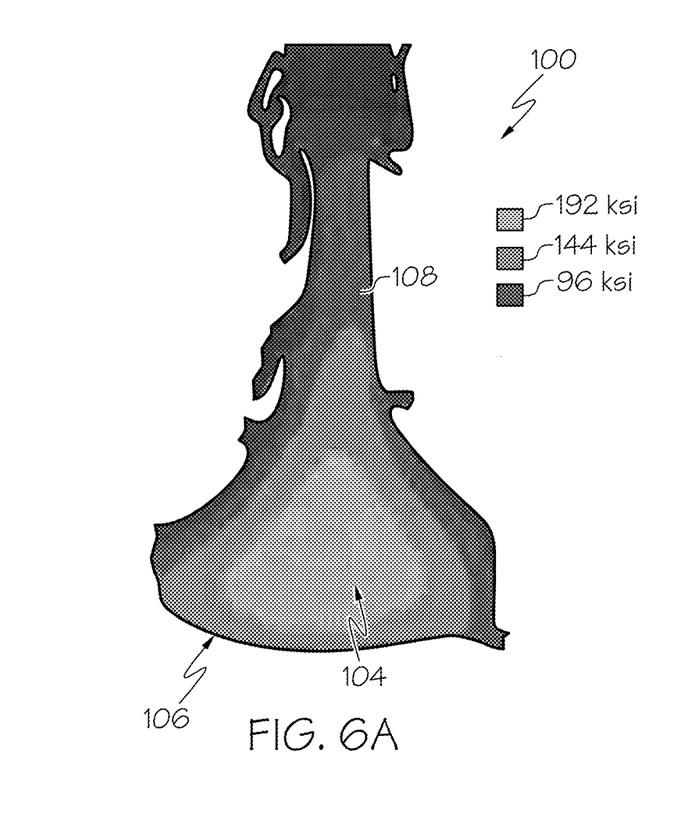
FIG. 6A represents a computer model of a rotor disk with no bore cavity under operating conditions.
Figure 6B:
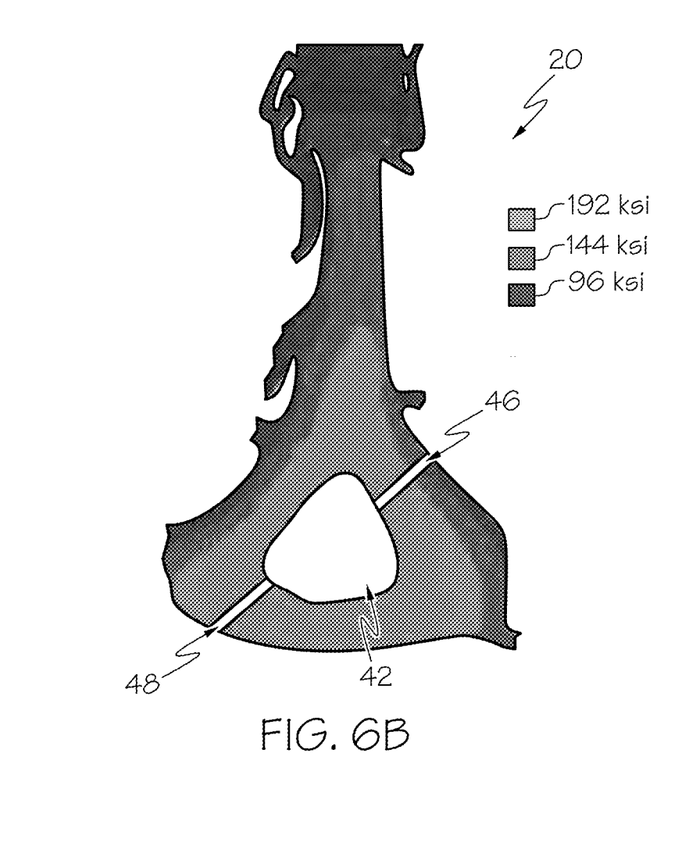
FIG. 6B represents a computer model of a rotor disk including bore cavity under operating conditions.

Referring now to FIGS. 6A and 6B, computer models of a rotor disk 100 with no bore cavity (FIG. 6A) and the bore body 26 (FIG. 6B) are illustrated under heated operating conditions. As can be seen by FIG. 6A, a temperature gradient extends radially from a center region 104 of bore body 106 to web 108. In some embodiments, a stress within the center region 104 may be up to 188 ksi in the illustrated example due to the thermal gradient. Referring now to FIG. 6B, by omitting the material to form the bore cavity 42 and the bleed passages 46, 48, the temperature gradient and thus the maximum stress may be reduced.

Various embodiments of the rotor disks relate to methods for producing three-dimensional objects by layering two-dimensional structures one on the other by powder additive manufacturing, such as using electron beam melting (EBM), selective laser sintering (SLS) and/or selective laser melting (SLM). The use of additive manufacturing processes can allow the rotor disk 20 or parts thereof to be formed as a single, monolithic piece of a same material.

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program.

As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

As used herein, the term "electron beam" refers to any charged particle beam. The sources of a charged particle beam can include an electron gun, a linear actuator, etc.

Figure 7:
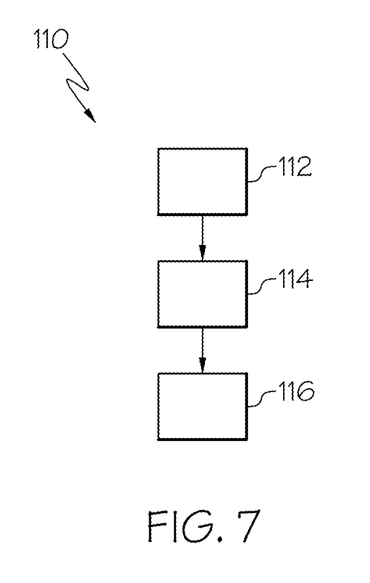
FIG. 7 illustrates a method of printing a rotor disk including a bore cavity, according to one or more embodiments shown and described herein.

Referring to FIG. 7, a method 110 of printing a rotor disk includes selecting a three-dimensional computer model of a desired embodiment of the rotor disk at step 112. As examples, the three-dimensional design model may be generated using a computer aided design (CAD) program or three-dimensional scanning a prototype of the rotor disk at one or more earlier steps. At step 114, the rotor disk is printed. The rotor disk is printed layer-by-layer as two-dimensional structures to include the bore, bore body, web and peripheral rim. Locations of the rotor disk may remain unprinted to provide bore cavity and bleed passages that intersect the bore cavity at step 116.

The above-described rotor disks include a bore body that includes a bore cavity that extends around the bore in an annular fashion. The bore cavity is sized to comprise a selected cross-sectional area of the bore body to remove material from the bore body that would otherwise be under increased thermal stress during operating conditions. With the bore cavity present, the bore body has a sufficient cross-sectional area to withstand mechanically-induced operational stresses.

The above-described rotor disks are made thicker at the bore circumference to reduce hoop stress induced by rotation and temperature gradient in the radial direction. The bore cavity is provided in the bore body to carry air of different temperatures, at different phases of engine operation. Bleed passages are provided that intersect the bore cavity in order to let the bore cavity communicate with the environment and allow for ingress and egress of air to and from the bore cavity. The bore cavity reduces the thermal gradient in the bore body in the radial direction. The bore cavity also removes material that would be present if the bore cavity was absent, which reduces weight of the rotor disk. The bore cavity can be any suitable cross-section shape enabled by a 3D printing process. Rotor disks with bore body cavities may be used in high pressure compressors (HPC), high pressure turbines (HPT) and low pressure turbines (LPT).

Further aspects of the invention are provided by the subject matter of the following clauses:

Clause 1: A rotor disk for a gas turbine engine, comprising a disk body having a central bore extending therethrough, the disk body comprising a bore body that extends around the central bore, a web that extends radially outward from the bore body having decreased thickness relative to the bore body and a peripheral rim that is located at an outer end of the web, the peripheral rim comprising blade mounting structures for engaging complementary mounting structures of rotor blades; and the bore body having a bore cavity that is enclosed by the bore body and that extends continuously through the bore body and about an entire periphery of the central bore, the bore cavity having a central axis that forms a circle about the central bore.

Clause 2: The rotor disk of any preceding clause, wherein the bore cavity is at least about 40 percent of the cross-sectional area of the bore body, wherein the cross-sectional area is taken in a cross-sectional plane perpendicular to the central axis and extends radially.

Clause 3: The rotor disk of any preceding clause comprising at least one bleed passage that intersects the bore cavity, the at least one bleed passage including an inner end that intersects the bore cavity and an outer end that intersects an outer surface of the bore body.

Clause 4: The rotor disk of any preceding clause, wherein the at least one bleed passage has a width that is less than a width of the bore cavity.

Clause 5: The rotor disk of any preceding clause, wherein the at least one bleed passage has a width that is less than about 50 percent of a width of the bore cavity.

Clause 6: The rotor disk of any preceding clause comprising multiple bleed passages that intersect the bore cavity, each bleed passage including an inner end that intersects the bore cavity and an outer end that intersects an outer surface of the bore body.

Clause 7: The rotor disk of any preceding clause, wherein each bleed passage extends at an angle of between about 30 degrees and about 70 degrees to a radial axis of the disk body.

Clause 8: The rotor disk of any preceding clause, wherein at least one pair of the bleed passages are aligned along a same line on opposite sides of the bore cavity.

Clause 9: A rotor disk for a gas turbine engine, comprising a disk body having a central bore extending therethrough, the disk body comprising a bore body that extends around the central bore, a web that extends radially outward from the bore body having decreased thickness relative to the bore body and a peripheral rim that is located at an outer end of the web, the peripheral rim comprising blade mounting structures for engaging complementary mounting structures of rotor blades; and the bore body having a bore cavity that extends continuously through the bore body and about an entire periphery of the central bore, the bore cavity is at least about 25 percent of a cross-sectional area of the bore body, wherein the cross-sectional area is taken in a cross-sectional plane perpendicular to a central axis of the bore cavity and extends radially.

Clause 10: The rotor disk of any preceding clause, wherein the bore cavity is at least about 40 percent of the cross-sectional area of the bore body.

Clause 11: The rotor disk of any preceding clause comprising at least one bleed passage that intersects the bore cavity, the at least one bleed passage including an inner end that intersects the bore cavity and an outer end that intersects an outer surface of the bore body.

Clause 12: The rotor disk of any preceding clause, wherein the at least one bleed passage has a width that is less than a width of the bore cavity.

Clause 13: The rotor disk of any preceding clause, wherein the at least one bleed passage has a width that is less than about 50 percent of a width of the bore cavity.

Clause 14: The rotor disk of any preceding clause comprising multiple bleed passages that intersect the bore cavity, each bleed passage including an inner end that intersects the bore cavity and an outer end that intersects an outer surface of the bore body.

Clause 15: The rotor disk of any preceding clause, wherein each bleed passages extends at an angle of between about 30 degrees and about 70 degrees to a radial axis of the disk body.

Clause 16: The rotor disk of any preceding clause, wherein at least one pair of the bleed passages are aligned along a same line on opposite sides of the bore cavity.

Clause 17: A method of forming a rotor disk for a gas turbine engine, the method comprising selecting a three-dimensional computer model of the rotor disk; printing the rotor disk using the three-dimensional model, the rotor disk, once printed, comprising a disk body having a central bore extending therethrough, the disk body comprising a bore body that extends around the central bore, a web that extends radially outward from the bore body having decreased thickness relative to the bore body and a peripheral rim that is located at an outer end of the web, the peripheral rim comprising blade mounting structures for engaging complementary mounting structures of rotor blades; and the bore body having a bore cavity that extends continuously through the bore body and about an entire periphery of the central bore, the bore cavity is at least about 25 percent of a cross-sectional area of the bore body, wherein the cross-sectional area is taken in a cross-sectional plane perpendicular to a central axis of the bore cavity and extends radially.

Clause 18: The method of any preceding clause comprising printing at least one bleed passage that intersects the bore cavity, the at least one bleed passage including an inner end that intersects the bore cavity and an outer end that intersects an outer surface of the bore body.

Clause 19: The method of any preceding clause, wherein the at least one bleed passage has a width that is less than about 50 percent of a width of the bore cavity.

Clause 20: The method of any preceding clause, wherein the at least one bleed passage extends at an angle of between about 30 degrees and about 70 degrees to a radial axis of the disk body.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A rotor disk for a gas turbine engine, comprising:
a disk body having a central bore extending therethrough, the disk body comprising a bore body that extends around the central bore, a web that extends radially outward from the bore body having decreased thickness relative to the bore body and a peripheral rim that is located at a radially outer end of the web, the peripheral rim comprising blade mounting structures disposed radially outward of the web and configured to engage complementary mounting structures of rotor blades;

the bore body having a bore cavity that is enclosed by the bore body and that extends continuously through the bore body and about an entire periphery of the central bore, the bore cavity having a central axis that forms a circle about the central bore; and at least one bleed passage that intersects the bore cavity, the at least one bleed passage including an inner end that intersects the bore cavity and an outer end that intersects an outer surface of the bore body;

wherein the at least one bleed passage extends outward from the bore cavity in a direction toward an outer terminus of the bore body such that the bleed passage extends radially beyond the bore cavity and intersects the outer surface of the bore body closer to the outer terminus than to the bore cavity.

2. The rotor disk of claim 1, wherein the bore cavity is at least 40 percent of the cross-sectional area of the bore body, wherein the cross-sectional area is taken in a cross-sectional plane perpendicular to the central axis and extends radially.

3. The rotor disk of claim 1, wherein the at least one bleed passage has a width that is less than a width of the bore cavity.

4. The rotor disk of claim 1, wherein the at least one bleed passage has a width that is less than 50 percent of a width of the bore cavity.

5. The rotor disk of claim 1 comprising multiple bleed passages that intersect the bore cavity, each bleed passage including an inner end that intersects the bore cavity and an outer end that intersects an outer surface of the bore body.

6. The rotor disk of claim 5, wherein each bleed passage extends at an angle of between 30 degrees and 70 degrees to a radial axis of the disk body.

7. The rotor disk of claim 5, wherein at least one pair of the bleed passages are aligned along a same line on opposite sides of the bore cavity.

8. A rotor disk for a gas turbine engine, comprising:
a disk body having a central bore extending therethrough, the disk body comprising a bore body that extends around the central bore, a web that extends radially outward from the bore body having decreased thickness relative to the bore body and a peripheral rim that is located at a radially outer end of the web, the peripheral rim comprising blade mounting structures disposed radially outward of the web and configured to engage complementary mounting structures of rotor blades;

the bore body having a bore cavity that extends continuously through the bore body and about an entire periphery of the central bore, the bore cavity is at least 25 percent of a cross-sectional area of the bore body, wherein the cross-sectional area is taken in a cross-sectional plane perpendicular to a central axis of the bore cavity and extends radially; and at least one bleed passage that intersects the bore cavity, the at least one bleed passage including an inner end that intersects the bore cavity and an outer end that intersects an outer surface of the bore body;

wherein the at least one bleed passage extends outward from the bore cavity in a direction toward an outer terminus of the bore body such that the bleed passage extends radially beyond the bore cavity and intersects the outer surface of the bore body closer to the outer terminus than to the bore cavity.

9. The rotor disk of claim 8, wherein the bore cavity is at least 40 percent of the cross-sectional area of the bore body.

10. The rotor disk of claim 8, wherein the at least one bleed passage has a width that is less than a width of the bore cavity.

11. The rotor disk of claim 8, wherein the at least one bleed passage has a width that is less than 50 percent of a width of the bore cavity.

12. The rotor disk of claim 8 comprising multiple bleed passages that intersect the bore cavity, each bleed passage including an inner end that intersects the bore cavity and an outer end that intersects an outer surface of the bore body.

13. The rotor disk of claim 12, wherein each bleed passage extends at an angle of between 30 degrees and 70 degrees to a radial axis of the disk body.

14. The rotor disk of claim 12, wherein at least one pair of the bleed passages are aligned along a same line on opposite sides of the bore cavity.

15. A method of forming a rotor disk for a gas turbine engine, the method comprising:
selecting a three-dimensional computer model of the rotor disk; printing the rotor disk using the three-dimensional model, the rotor disk, once printed, comprising:
a disk body having a central bore extending therethrough, the disk body comprising a bore body that extends around the central bore, a web that extends radially outward from the bore body having decreased thickness relative to the bore body and a peripheral rim that is located at a radially outer end of the web, the peripheral rim comprising blade mounting structures disposed radially outward of the web and configured to engage complementary mounting structures of rotor blades;

the bore body having a bore cavity that extends continuously through the bore body and about an entire periphery of the central bore, the bore cavity is at least about 25 percent of a cross-sectional area of the bore body, wherein the cross-sectional area is taken in a cross-sectional plane perpendicular to a central axis of the bore cavity and extends radially; and at least one bleed passage that intersects the bore cavity, the at least one bleed passage including an inner end that intersects the bore cavity and an outer end that intersects an outer surface of the bore body;

wherein the at least one bleed passage extends outward from the bore cavity in a direction toward an outer terminus of the bore body such that the bleed passage extends radially beyond the bore cavity and intersects the outer surface of the bore body closer to the outer terminus than to the bore cavity.

16. The method of claim 15, wherein the at least one bleed passage has a width that is less than 50 percent of a width of the bore cavity.

17. The method of claim 15, wherein the at least one bleed passage extends at an angle of between 30 degrees and 70 degrees to a radial axis of the disk body.

* * * * *